US009492715B2

(12) United States Patent
Ishii et al.

(10) Patent No.: US 9,492,715 B2
(45) Date of Patent: *Nov. 15, 2016

(54) GOLF BALL INCLUDING A BLEND OF HIGHLY NEUTRALIZED ACID POLYMERS AND METHOD OF MANUFACTURE

(75) Inventors: Hideyuki Ishii, Portland, OR (US);
Hsin Cheng, Yun-lin Hsien (TW);
Chien-Hsin Chou, Yun-lin Hsien (TW);
Yasushi Ichikawa, Tualatin, OR (US);
Chen-Tai Liu, Yun-lin Hsien (TW);
Arthur Molinari, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 1038 days.

This patent is subject to a terminal disclaimer.

(21) Appl. No.: 13/194,064

(22) Filed: Jul. 29, 2011

(65) Prior Publication Data

US 2013/0029788 A1 Jan. 31, 2013

(51) Int. Cl.
*A63B 37/02* (2006.01)
*A63B 37/00* (2006.01)
(Continued)

(52) U.S. Cl.
CPC ....... *A63B 37/0043* (2013.01); *A63B 37/0003* (2013.01); *A63B 37/005* (2013.01); *A63B 37/0024* (2013.01); *A63B 37/0035* (2013.01); *A63B 37/0047* (2013.01); *A63B 37/0049* (2013.01); *A63B 37/0051* (2013.01); *A63B 37/0059* (2013.01); *A63B 37/0061* (2013.01); *A63B 37/0062* (2013.01); *A63B 37/0063* (2013.01); *A63B 37/0064* (2013.01); *A63B 37/0066* (2013.01); *A63B 37/0074* (2013.01); *A63B 37/0075* (2013.01);
(Continued)

(58) Field of Classification Search
CPC ..... C08K 5/098; C08K 5/09; C08L 2205/02; C08L 2/0876; A63B 37/0059; A63B 37/0051
USPC ................. 473/371–374, 376, 377
See application file for complete search history.

(56) References Cited

U.S. PATENT DOCUMENTS

| 5,155,157 A | 10/1992 | Statz et al. |
| 5,409,974 A | 4/1995 | Sullivan et al. |

(Continued)

FOREIGN PATENT DOCUMENTS

| GB | 2164342 | 3/1986 |
| JP | 2009165824 A | 7/2009 |

(Continued)

OTHER PUBLICATIONS

DuPont HPF 2000—Specification Sheet.*
(Continued)

*Primary Examiner* — John E Simms, Jr.
(74) *Attorney, Agent, or Firm* — Honigman Miller Schwartz and Cohn LLP

(57) ABSTRACT

A golf ball having an inner core layer, an outer core layer essentially enclosing the inner core layer, an inner cover layer essentially enclosing the outer core layer, and an outer cover layer essentially enclosing the inner cover layer. The golf ball includes a blend of at least first and second highly neutralized acid polymers, each having a Vicat softening temperature and a specific gravity. The absolute value of the difference between the Vicat softening temperatures is no more than about 15° C. and the absolute value of the difference between the specific gravities is no more than about 0.015. Also, the method of making the blend and the golf ball is disclosed.

18 Claims, 1 Drawing Sheet

(51) Int. Cl.
  *C08K 5/098* (2006.01)
  *C08K 5/09* (2006.01)
  *C08L 23/08* (2006.01)
  *C08L 9/00* (2006.01)
  *C08L 101/12* (2006.01)
  *A63B 45/00* (2006.01)

(52) U.S. Cl.
  CPC ...... *A63B 37/0076* (2013.01); *A63B 37/0078* (2013.01); *A63B 37/0082* (2013.01); *A63B 45/00* (2013.01); *C08K 5/09* (2013.01); *C08K 5/098* (2013.01); *C08L 9/00* (2013.01); *C08L 23/0876* (2013.01); *C08L 101/12* (2013.01); *C08L 2205/02* (2013.01)

(56) References Cited

U.S. PATENT DOCUMENTS

| | | | |
|---|---|---|---|
| 6,350,793 | B1 | 2/2002 | Kennedy, III et al. |
| 6,394,913 | B1 | 5/2002 | Nesbitt et al. |
| 6,450,901 | B1 | 9/2002 | Binette et al. |
| 6,653,382 | B1 | 11/2003 | Statz et al. |
| 7,041,721 | B2 | 5/2006 | Rajagopalan et al. |
| 7,160,954 | B2 * | 1/2007 | Zieske et al. ............... 525/329.9 |
| 7,402,114 | B2 | 7/2008 | Binette et al. |
| 7,652,086 | B2 | 1/2010 | Sullivan et al. |
| 7,654,917 | B2 | 2/2010 | Sullivan et al. |
| 7,753,810 | B2 | 7/2010 | Sullivan et al. |
| 2004/0077799 | A1 | 4/2004 | Rajagopalan et al. |
| 2005/0261084 | A1 * | 11/2005 | Sullivan et al. ............... 473/354 |
| 2005/0261424 | A1 | 11/2005 | Snell et al. |
| 2006/0189413 | A1 * | 8/2006 | Boehm et al. ................ 473/371 |
| 2006/0281587 | A1 * | 12/2006 | Voorheis ...................... 473/371 |
| 2008/0171617 | A1 * | 7/2008 | Boehm et al. ................ 473/374 |
| 2008/0220906 | A1 * | 9/2008 | Sullivan et al. .............. 473/377 |
| 2008/0274832 | A1 * | 11/2008 | Comeau et al. .............. 473/374 |
| 2009/0181801 | A1 | 7/2009 | Sullivan et al. |
| 2009/0227394 | A1 | 9/2009 | Bulpett et al. |
| 2009/0280928 | A1 | 11/2009 | Comeau et al. |
| 2010/0179001 | A1 * | 7/2010 | Cheng et al. ................. 473/374 |
| 2011/0130220 | A1 | 6/2011 | Ichikawa et al. |
| 2011/0143863 | A1 | 6/2011 | Sullivan et al. |
| 2012/0077621 | A1 | 3/2012 | Ishii et al. |

FOREIGN PATENT DOCUMENTS

| | | |
|---|---|---|
| JP | 2010142529 A | 7/2010 |
| JP | 2011115584 A | 6/2011 |
| WO | 0043077 | 7/2000 |
| WO | 0168193 | 9/2001 |

OTHER PUBLICATIONS

HPF 1000 data sheet—DuPont.*
HPF 2000 data sheet—DuPont.*
International Search Report and Written Opinion in PCT Application No. PCT/US2012/046695, mailed on Feb. 15, 2013.
International Search Report and Written Opinion in PCT Application No. PCT/US2012/046701, mailed on Feb. 15, 2013.
International Search Report and Written Opinion in PCT Application No. PCT/US2012/046708, mailed on Feb. 15, 2013.
Communication pursuant to Article 94(3) EPC dated Mar. 17, 2016 in European Application No. 12819941.1, 5 pages, only applicant's description.
Office Action and Search Report dated Jul. 4, 2016 in Japanese patent application No. 2014-522864, 7 pages.

* cited by examiner

US 9,492,715 B2

GOLF BALL INCLUDING A BLEND OF HIGHLY NEUTRALIZED ACID POLYMERS AND METHOD OF MANUFACTURE

BACKGROUND OF THE INVENTION

1. Field of the Invention

The present invention relates to a golf ball including a blend of highly neutralized acid polymers. The invention also relates to a method of manufacturing products, particularly golf balls, including a blend of highly neutralized acid polymers, and to a method for blending highly neutralized acid polymers.

2. Description of Related Art

Golf balls are important sporting goods that have changed with changes in technology. For example, balls were first made of wood, and then by stuffing boiled, softened feathers into a leather sack. The sack typically was painted white, and would tighten upon drying. However, because the feather ball tended to absorb moisture and to split, many balls were required to play a round. Also, these feather balls were expensive as compared with wooden balls.

Both feather and wooden balls were in use until the gutta percha ball was made. The gutta percha ball was relatively inexpensive and easily manufactured. Also, the gutta percha ball was fairly durable, as compared with the feather ball, performed well because the surface could easily be roughened to improve flight characteristics, and so became popular. However, the ball exhibited a tendency to break up in flight.

Golf balls comprising other elastic materials then were developed. For example, a golf ball having a rubber core and an elastic thread wound tightly around the core was developed. The winding was covered with gutta percha at first, but later with balata. However, balata-covered golf balls often are damaged by players who are less skilled at striking the ball. Thus, tougher covers were developed, including in particular covers comprising a Surlyn® compound or a polyurethane compound.

The interior structure of the golf ball also has advanced, with plastics and polymeric materials having properties and characteristics appropriate for manufacture of high-quality, high-performance, affordable golf balls. In particular, polymeric materials having properties and characteristics appropriate for golf ball manufacture have been developed. Such polymeric materials include polyurethanes and ionomeric materials, including highly neutralized acid polymers. Blended materials also are used to manufacture other products.

Blends of materials often are used to obtain properties and characteristics of golf balls and other products, which properties and characteristics may not be available from a single material. However, many material blends that manufacturers seek to make are difficult, if not impossible, to make successfully because the materials are not compatible or are not easily combined. In particular, highly neutralized acid polymers typically are difficult to blend.

Therefore, there exists a need for a golf ball comprising a layer having properties and characteristics obtained by blending polymeric materials. Further, there exists a need for method of manufacturing products, particularly golf balls, including a blend of highly neutralized acid polymers, and for a method for blending these highly neutralized acid polymers.

SUMMARY OF THE INVENTION

In an aspect, the invention relates to a golf ball comprising a blend of highly neutralized acid polymers. The golf ball has an inner core layer, an outer core layer essentially enclosing the inner core layer, an inner cover layer essentially enclosing the outer core layer, and an outer cover layer essentially enclosing the inner cover layer. The golf ball includes a blend of at least first and second highly neutralized acid polymers, each having a Vicat softening temperature and a specific gravity. The absolute value of the difference between the Vicat softening temperatures is no more than about 15° C. and the absolute value of the difference between the specific gravities is no more than about 0.015.

In another aspect, the invention relates to a method of manufacturing a product, particularly a golf ball, comprising a blend of highly neutralized acid polymers. In particular, the invention relates to a method of manufacturing a golf ball comprising a blend of highly neutralized acid polymers including controlling the differences in Vicat softening temperatures and specific gravities of the highly neutralized acid polymers of the blend.

In still another aspect, the invention relates to a method of blending highly neutralized acid polymers. In particular, the invention relates to a method of blending highly neutralized acid polymers by controlling the differences in Vicat softening temperatures and specific gravities of the highly neutralized acid polymers of the blend.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
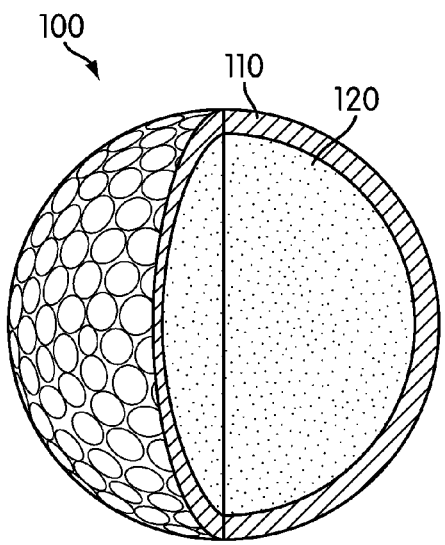
FIG. 1 shows a representative golf ball in accordance with this disclosure having a two-piece construction comprising a core and a cover layer.

Generally, the invention relates to a golf ball including a blend of highly neutralized acid polymers. The invention also relates to a method of manufacturing a golf ball comprising a blend of highly neutralized acid polymers. In particular, the invention relates to a method of manufacturing a golf ball comprising a blend of highly neutralized acid polymers including controlling the differences in Vicat softening temperatures and specific gravities of the highly neutralized acid polymers of the blend.

In another aspect, the invention relates to a method of blending highly neutralized acid polymers. In particular, the invention relates to a method of blending highly neutralized acid polymers by controlling the differences in Vicat softening temperatures and specific gravities of the highly neutralized acid polymers of the blend.

Blending highly neutralized acid polymers can be difficult. The properties and characteristics of ionic polymers such as highly neutralized acid polymers can cause difficulty in blending. The skilled practitioner recognizes that highly neutralized acid polymers act like cross-linked polymers because the neutralized carboxylate moieties, i.e., the polar parts of the molecule, tend to cluster together in the otherwise non-polar polymer. However, the clusters tend to separate when heated, thus causing the compound to soften like a thermoplastic material and to provide an opportunity to process the heated material.

Thus, to form a blend, the compounds that make up a blend of highly neutralized acid polymers typically will be heated to take advantage of the resultant thermoplasticity. However, the compounds often will remain difficult to blend, because the component polymers often do not soften under the same conditions and thus will be difficult to process.

The inventors have discovered that controlling the differences between the Vicat softening temperatures and the specific gravities of the highly neutralized acid polymers forming the blend ameliorates processing problems encountered when blending the materials and yields an essentially homogeneous blend. These processing problems include formation of gas from a polymer that has a lower melting temperature than the melting temperature of the other polymers in the blend and stratification of molten material. Gas may be formed if a highly neutralized acid polymer is over-heated to the higher softening temperature required by the other components of the blend. Formation of gas during processing causes voids in the processed product. A difference in specific gravities makes it difficult to control the mixing ratio, leading to stratification and heterogeneity in a product. Stratification and heterogeneity in the molded product also is a defect in the processed product. These and other defects in products are reduced when highly neutralized acid polymers are processed in accordance with the method disclosed herein.

The skilled practitioner recognizes that thermoplastic material can be processed in many ways, and typically is processed by injection molding or compression molding. Injection molding is a process typically used in the manufacture of golf balls. Successful injection molding requires that the composition being molded be flowable to fill a mold. Thus, formation of gas during injection will disrupt the process and may damage the mold and other processing equipment, in addition to causing defects in the product. Similarly, molding heterogeneous material may cause distribution problems in the mold and poor product quality due to problems in controlling the mixing ratio.

In an embodiment of the invention, the Vicat softening temperatures and the specific gravities of the components or materials being blended are controlled so that the differences are within ranges that the inventors have discovered make processing of the blend easy and result in high quality processed products.

For convenience, embodiments of the invention will be described with detail as they relate to 2-component blends. However, the invention relates to ternary, quaternary, and higher order blends. With the description provided herein, the skilled practitioner will be able to apply the subject matter of the invention to blends of any number of components.

In accordance with the invention, a first highly neutralized acid polymer has a first Vicat softening temperature and a second highly neutralized acid polymer has a second Vicat softening temperature. The inventors have discovered that blending of these two highly neutralized acid polymers is facilitated if the difference between the first and second Vicat softening temperatures is controlled within predetermined values, and typically is minimized. Thus, in an embodiment of the invention, the absolute value of the difference in Vicat softening temperatures of highly neutralized acid polymers to be blended is limited to about 15° C. or less, typically about 10° C. or less, and more typically about 8° C. or less. In other embodiments, the difference between the first Vicat softening temperature and the second Vicat softening temperature is about 5° C. or less, more typically about 2° C. or less, and even more typically about 1° C. or less.

In another aspect, the absolute value of the difference between the specific gravities of the highly neutralized acid polymers to be blended is controlled within predetermined values, and typically is minimized. In an embodiment, the absolute value of the difference in specific gravities is limited to no more than about 0.015, typically no more than about 0.010, and more typically no more than about 0.005.

In a more typical embodiment, both the difference in Vicat softening temperatures and the difference in specific gravities are controlled. In embodiments, the differences can be individually limited to any of the ranges associated with that difference. Thus, the absolute value of the difference in Vicat softening temperatures is limited to about 15° C. or less, and the absolute value of the difference in specific gravities is limited to no more than about 0.015, typically no more than about 0.010, and more typically no more than about 0.005. Similarly, the absolute value of the difference in Vicat softening temperature is limited to about 10° C. or less, typically about 8° C. or less, more typically is about 5° C. or less, still more typically about 2° C. or less, and even more typically about 1° C. or less, while the absolute value of the difference in specific gravities is limited to no more than about 0.015, typically no more than about 0.010, and more typically no more than about 0.005.

Products comprising blends of highly neutralized acid polymers can be made with fewer defects in accordance with the invention by injection molding, compression molding, or processing the blend in accordance with any suitable manner for processing thermoplastic materials, by controlling the Vicat softening temperatures and specific gravities, as described herein. In particular, golf balls often are made, at least in part, by injection molding of thermoplastic materials. Thus, a method of making golf balls can benefit from the method of controlling the Vicat softening temperatures and specific gravities of the materials to be blended.

Thus, an embodiment of the invention is directed to a method of manufacturing a golf ball including a blend of highly neutralized acid polymers by controlling the differences in Vicat softening temperatures and specific gravities of the polymers to be blended and processing the blended material to form at least a part of a golf ball.

In an embodiment, highly neutralized acid polymers often used in a blend of highly neutralized acid polymers used in the manufacture of golf balls have a Vicat softening temperature of between about 30° C. and about 70° C., typically between about 40° C. and about 60° C., and more typically between about 50° C. and about 60° C. In an embodiment, the Vicat softening temperature of a first highly neutralized acid polymer of a blend is between about 50° C. and about 60° C. and the Vicat softening temperature of a second highly neutralized acid polymer of the blend is between about 40° C. and about 60° C.

FIG. 1 shows a golf ball 100 in accordance with a first embodiment of the present disclosure. Golf ball 100 is a two-piece golf ball. Specifically, golf ball 100 includes cover layer 110 substantially surrounding core 120. In golf ball 100, core 120 may be made of a blend of highly neutralized acid polymers.

Figure 2:
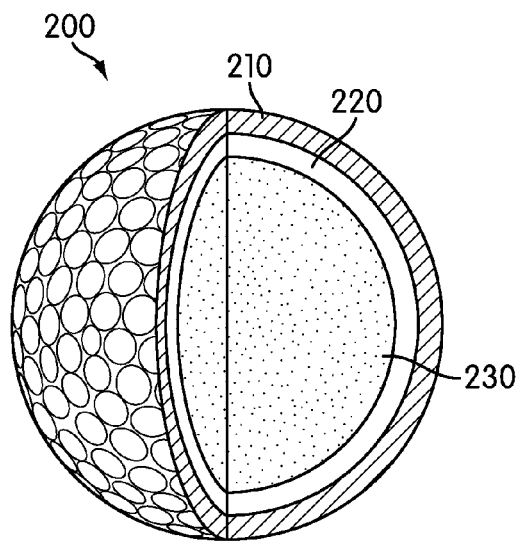
FIG. 2 shows a second representative golf ball in accordance with this disclosure having a three-piece construction comprising a core, an inner cover layer, and an outer cover layer.

FIG. 2 shows a golf ball 200 in accordance with a second embodiment of the present disclosure. Golf ball 200 includes a core 230, an inner cover layer 220 substantially surrounding core 230, and an outer cover layer 210 substantially surrounding inner cover layer 220. In some embodiments, both inner cover layer 220 and core 230 may comprise the blended highly neutralized acid polymers described herein.

Figure 3:
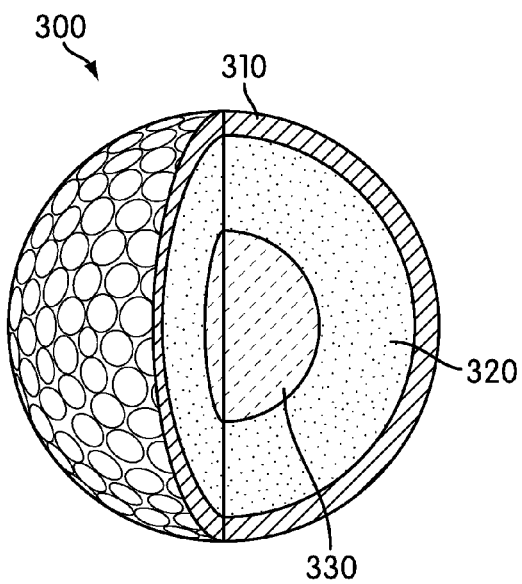
FIG. 3 shows a third representative golf ball in accordance with this disclosure having a three-piece construction comprising an inner core layer, an outer core layer, and a cover layer.

FIG. 3 shows a golf ball 300 in accordance with a third embodiment of the present disclosure. Golf ball 300 includes an inner core layer 330, an outer core layer 320 substantially surrounding inner core layer 330, and a cover layer 310 substantially surrounding outer core layer 320. In some embodiments, inner core layer 330 and outer core layer 320 may comprise blended highly neutralized acid polymers.

Figure 4:
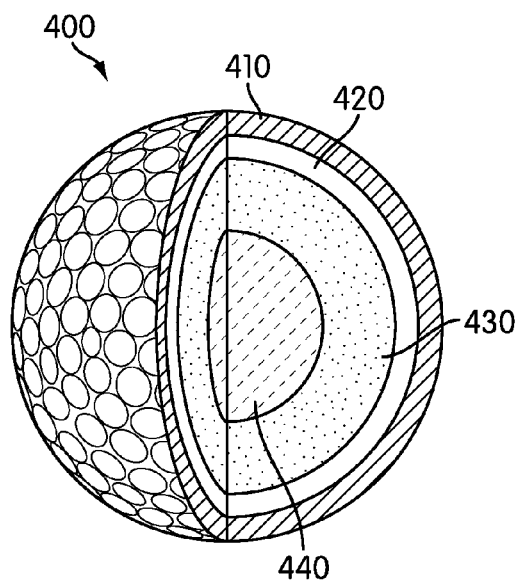
FIG. 4 shows a fourth representative golf ball in accordance with this disclosure having a four-piece construction comprising an inner core layer, an outer core layer, an inner cover layer, and an outer cover layer.

FIG. 4 shows a golf ball 400 in accordance with a fourth embodiment of the present disclosure. Golf ball 400 includes an inner core layer 440, an outer core layer 430 substantially surrounding inner core layer 440, an inner cover layer 420 substantially surrounding outer core layer 430, and an outer cover layer 410 substantially surrounding inner cover layer 420. In some embodiments, any or all of inner cover layer 420, outer core layer 430, and inner core layer 440 can comprise blended highly neutralized acid polymers.

Thus, each of these types of golf balls can be made in accordance with the method disclosed herein. Also, golf balls with additional layers, such as 5 or more layers, can be made in accordance with the method disclosed herein. Except as otherwise discussed herein below, any golf ball discussed herein may generally be any type of golf ball known in the art. Namely, unless the present disclosure indicates to the contrary, a golf ball may generally be of any construction conventionally used for golf balls, such as a regulation or non-regulation construction. Regulation golf balls are golf balls which meet the Rules of Golf as approved by the United States Golf Association (USGA). Golf balls discussed herein may also be made of any of the various materials known to be used in golf ball manufacturing, except as otherwise noted.

Furthermore, it is understood that any feature disclosed herein (including but not limited to various embodiments shown in the FIGS. and various chemical formulas or mixtures) may be combined with any other features disclosed here, as may be desired.

Typically, embodiments are directed to golf balls having core layers comprising blended highly neutralized acid polymers. More typically, the inner core layer of a golf ball comprises blended highly neutralized acid polymers. In particular, the core, or inner core layer, is made by injection molding. For convenience, embodiments of the invention will be described with particularity herein as they relate to such a 4-piece ball. However, with the information and guidance provided herein, the skilled practitioner will be able to design balls having more or different layers.

An embodiment is directed to a four-piece golf ball comprising an inner core layer 440; an outer core layer 430 enclosing the inner core layer; an inner cover layer 420 enclosing the outer core layer, and an outer cover layer 410 enclosing the inner cover layer. Inner core layer 440 comprises a blend comprising a first highly neutralized acid polymer having a first Vicat softening temperature of from about 50° C. to about 60° C. and a second highly neutralized acid polymer having a second Vicat softening temperature of from about 40° C. to about 60° C., and the absolute value of the difference between the first and second Vicat softening temperatures is controlled to no more than about 15° C.

In another typical embodiment, inner core layer 440 comprises a blend comprising a first highly neutralized acid polymer having a first specific gravity and a first Vicat softening temperature of from about 50° C. to about 60° C., and a second highly neutralized acid polymer having a second specific gravity and a second Vicat softening temperature of from about 40° C. to about 60° C., and the absolute value of the differences between the first and second Vicat softening temperatures and absolute value of the difference between the first and second specific gravities are controlled within predetermined values, thus facilitating forming a thermoplastic inner core layer comprising a blend of highly neutralized acid polymers. More typically, the absolute value of the difference between Vicat softening temperatures is no more than about 15° C., and the absolute value of the difference between specific gravities is no more than about 0.015.

Often, inner core layer 440 of embodiments of the invention has a specific gravity between about 0.85 to about 1.1, typically between about 0.9 and about 1.1. In embodiments, the specific gravity is adjusted to adjust the moment of inertia (MOI) to affect the spin rate of the ball. Lowering the specific gravity of inner core layer to a value less than about the specific gravities of the outer layers will increase the MOI and reduce the spin rate. Alternatively, increasing the specific gravity of the inner core layer decreases the MOI and increases the spin rate. With the information and guidance provided herein, the skilled practitioner can select a specific gravity of the blend to provide a desired MOI and can control the specific gravities of the highly neutralized acid polymers in the blend to form a homogeneous blend that forms a defect-free product.

In embodiments, a thick thermoset outer core layer often is used to protect the thermoplastic inner core layer. The thickness of the outer core layer typically is at least about 5 mm. Also, to have good flight performance, the inner core layer has a high coefficient of restitution (COR). To have a good spin rate of mid or short iron shots, the outer cover layer has a low flexural modulus. To reduce the spin rate of driver shots, the inner cover layer has a high Shore D hardness. In particular, to have a good moment of inertia, the inner cover layer has a greater specific gravity than the thermoset outer core layer.

As used herein, unless otherwise noted, Vicat softening temperature, compression deformation, hardness, COR, and flexural modulus, are measured as follows:

Vicat softening temperature: Measured in accordance with ASTM D-1525.

Compression deformation: The compression deformation herein indicates the deformation amount of a golf ball, or portion thereof, under a force. Specifically, when the force is increased to 130 kg from 10 kg, the deformation amount of the golf ball, or portion thereof, under a force of 130 kg, less the deformation amount of the golf ball, or portion thereof, under a force of 10 kg, is the compression deformation value. For example, a golf ball that deforms 0.5 mm under a 10 kg force and 5.0 mm under a 130 kg force has a compression deformation of 4.5 mm.

Hardness: Hardness of golf ball layer is measured generally in accordance with ASTM D-2240, but is measured on the land area of a curved surface of a molded golf ball.

Method of measuring COR: A golf ball is fired by an air cannon at a steel plate positioned about 1.2 meters away from the air cannon at an initial velocity of 40 m/sec. A speed monitoring device is located over a distance of 0.6 to 0.9 meters from the cannon. After striking the plate, the golf ball rebounds through the speed-monitoring device. The return velocity divided by the initial velocity is the COR.

Flexural modulus: Measured in accordance with ASTM D-790.

In embodiments in which inner core layer 440 has a high resilience, golf ball 400 will have a good flight performance. In embodiments of the invention, therefore, inner core layer 440 typically has a COR value from about 0.79 to about 0.89, more typically from about 0.795 to about 0.88. In some embodiments, inner core layer 440 has a first coefficient of restitution, golf ball 400 has a second coefficient of restitution, and the first coefficient of restitution is greater than the second coefficient of restitution.

Inner core layer 440 typically is made by an injection molding process, although a compression molding process may also be used. During an injection molding process, the temperature of the injection machine typically is set in a range of about 190° C. to about 220° C.

However, before the injection molding process, first and second highly neutralized acid polymers, and a blend thereof, should be kept in a moisture-resistant packaging or should be treated with a dry gas, typically air, to reduce the moisture level. Moisture in the compounds will cause voids in the product. Drying conditions for first and second highly neutralized acid polymers typically require 2 to 24 hours of dry air flow at a temperature below about 50° C. Moisture levels greater than 2,000 ppm in the highly neutralized acid polymer may make it necessary to employ vacuum as well as heat to remove moisture. The moisture level should be no more than about 1,000 ppm for production of products free from defects caused by moisture.

After drying, if necessary, the highly neutralized acid polymers may be dry-blended or be compounded in an extruder, for example, preparatory to injection molding to form a product, herein typically the inner core layer of a golf ball. Compounding produces a more intimate mixture and helps ensure homogeneity of product. Materials that are thus compounded are softened, forming a flowable mass, and blended. The blend then is further processed in, for example, an injection molding process, to form a product, such as a layer of a golf ball.

Any ratio of components can be blended. In one embodiment, the ratio of the first highly neutralized acid polymer to the second highly neutralized acid polymer is from about 20:80 to about 80:20. In another embodiment, the ratio is from about 30:70 to about 70:30, and in another embodiment, the ratio is from about 40:60 to about 60:40; in still another embodiment, the ratio is about 50:50.

In embodiments of the invention, suitable highly neutralized acid polymers include, but are not limited to, HPF resins such as HPF1000, HPF2000, HPF AD1024, HPF AD1027, HPF AD1030, HPF AD1035, HPF AD1040, all produced by E. I. Dupont de Nemours and Company. In embodiments, inner core layer 440 comprises a blend of highly neutralized acid polymers and optionally additives, fillers, and/or melt flow modifiers. The acid polymer typically is neutralized to 80% or higher, including up to 100%, with a suitable cation source, such as magnesium, sodium, zinc, or potassium. The cation source of first and second highly neutralized acid polymers may be the same or different.

Suitable additives and fillers include, for example, blowing and foaming agents, optical brighteners, coloring agents, fluorescent agents, whitening agents, UV absorbers, light stabilizers, defoaming agents, processing aids, nanofillers, antioxidants, stabilizers, softening agents, fragrance components, plasticizers, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled.

Suitable melt flow modifiers include, for example, fatty acids and salts thereof, polyamides, polyesters, polyacrylates, polyurethanes, polyethers, polyureas, polyhydric alcohols, and combinations thereof.

Each of the compounds discussed herein for any particular embodiment may be mixed and matched with any other specific embodiment of another compound according to the description herein. Furthermore, any compound may generally be used in combination with other compounds of the same type, such that any list herein includes mixtures thereof, unless otherwise specified.

In embodiments of the invention, the diameter of inner core layer 440 may be in a range of from about 19 mm to about 32 mm, or from about 20 mm to about 30 mm, or from about 21 mm to about 28 mm.

Inner core layer 440 typically has a compression deformation value in a range of from about 3 mm to about 5.5 mm. In some embodiments, inner core layer 440 has a compression deformation value in a range of from about 3.5 mm to about 5 mm. Further, inner core layer 440 has a surface Shore D hardness of from 45 to 55 at any single point on a cross-section obtained by cutting inner core layer 440 in half, and has a Shore D cross-sectional hardness difference between any two points on the cross-section of within ±6. This hardness condition ensures that the golf ball will exhibit stable performance. In some embodiments, the hardness difference between any two points on the cross-section is within ±3.

Outer core layer 430 typically is formed of thermoset materials, typically by crosslinking a polybutadiene rubber composition. When other rubber is used in combination with a polybutadiene, it is typical that polybutadiene is included as a principal component. Specifically, a proportion of polybutadiene in the entire base rubber typically is equal to or greater than about 50% by weight, and more typically is equal to or greater than about 80% by weight. A polybutadiene having a proportion of cis-1,4 bonds of equal to or greater than about 60 mol %, and further, equal to or greater than about 80 mol %, is most typical.

In some embodiments, cis-1,4-polybutadiene may be used as the base rubber and mixed with other ingredients. In some embodiments, the amount of cis-1,4-polybutadiene may be at least about 50 parts by weight, based on 100 parts by weight of the rubber compound.

Various additives may be added to the base rubber to form a compound. The additives may include a cross-linking agent and a filler. In some embodiments, the cross-linking agent may be zinc diacrylate, magnesium acrylate, zinc methacrylate, or magnesium methacrylate. In some embodiments, zinc diacrylate may provide advantageous resilience properties.

The filler may be used to increase the specific gravity of the rubber compound. The filler may include zinc oxide, barium sulfate, calcium carbonate, or magnesium carbonate.

In some embodiments, zinc oxide may be selected for its advantageous properties. Metal powder, such as tungsten, may alternatively be used as a filler to achieve a desired specific gravity. In some embodiments, the specific gravity of outer core layer 430 may be from about 1.05 to about 1.45. In some embodiments, the specific gravity of outer core layer 430 may be from about 1.05 to about 1.35.

In some embodiments, a polybutadiene synthesized using a rare earth element catalyst may be used. In some embodiments, rare earth element catalysis of the polybutadiene reaction is typical. Excellent resilience performance of a golf ball may be achieved by using this polybutadiene. Examples of rare earth element catalysts include lanthanum series rare earth element compounds. Other catalysts may include an organoaluminum compound, an alumoxane, and halogen containing compounds. A lanthanum series rare earth element compound is typical. Polybutadiene obtained by using lanthanum series rare earth-based catalysts usually employs a combination of lanthanum series rare earth (atomic number of 57 to 71) compounds, but particularly typical is a neodymium compound.

In some embodiments, the polybutadiene rubber composition may comprise at least from about 0.5 parts by weight to about 5 parts by weight of a halogenated organosulfur compound. In some embodiments, the polybutadiene rubber composition may comprise at least from about 1 part by weight to about 4 parts by weight of a halogenated organosulfur compound. The halogenated organosulfur compound is selected from the group consisting of pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol; 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; pentabromothiophenol; 2-bromothiophenol; 3-bromothiophenol 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; and their zinc salts and other metal salts thereof, and mixtures thereof.

Outer core layer 430 typically is made by compression molding. Suitable vulcanization conditions include a vulcanization temperature of between about 130° C. and about 190° C. and a vulcanization time of between about 5 and about 20 minutes. To obtain the desired rubber crosslinked body for use as a layer, particularly outer core layer 430, of the golf ball described herein, the vulcanization temperature is preferably at least about 140° C.

Typically, outer core layer 430 has a surface Shore D hardness of from 50 to 60, and the surface hardness of outer core layer 430 is higher than the surface hardness of inner core layer 440.

When outer core layer 430 is produced by vulcanizing and curing the rubber composition in the above-described way, advantageous use may be made of a method in which the vulcanization step is divided into two stages: first, the outer core layer material is placed in an outer core layer-forming mold and subjected to an initial vulcanization so as to produce a pair of semi-vulcanized hemispherical cups, following which a prefabricated inner core layer is placed in one of the hemispherical cups and is covered by the other hemispherical cup, in which state complete vulcanization is carried out.

The surface of inner core layer 440 placed in the hemispherical cups may be roughened before the placement to increase adhesion between inner core layer 440 and outer core layer 430. In some embodiments, the inner core layer surface may be pre-coated with an adhesive or pre-treated with chemical(s) before placing inner core layer 440 in the hemispherical cups to enhance the durability of the golf ball and enable a high rebound.

Inner cover layer 420 or outer cover layer 410 of golf ball 400 has a thickness of from about 0.5 mm to about 2 mm. In some embodiments, inner cover layer 420 or outer cover layer 410 of the present disclosure has a thickness of from about 0.8 mm to about 2 mm. In some embodiments, inner cover layer 420 or outer cover layer 410 has a thickness of from about 1 mm to about 1.5 mm.

In some embodiments, inner cover layer 420 has a Shore D hardness as measured on the curved surface of at least about 65. In some embodiments, outer cover layer 410 of golf ball 400 has a Shore D hardness as measured on the curved surface of from 45 to 60.

To have a good spin performance, outer cover layer 410 has a flexural modulus of from about 200 psi to about 3,000 psi.

Typically, an inner cover layer (such as inner cover layer 220 shown in FIG. 2, or inner cover layer 420 shown in FIG. 4) may comprise a first thermoplastic material. An outer cover layer (such as outer cover layer 210 shown in FIG. 2, or outer cover layer 410 shown in FIG. 4) may comprise a second thermoplastic material. The first and second thermoplastic material may independently comprise at least one of an ionomer resin, a highly neutralized acid polymer, a polyamide resin, a polyurethane resin, a polyester resin, and a combination thereof. In some embodiments, the first thermoplastic material may be the same as the second thermoplastic material. In some embodiments, the first thermoplastic material may be different from the second thermoplastic material.

Other properties may be desirable for golf ball 400. In some embodiments, it may be desirable for golf ball 400 to have a moment of inertia between about 82 g-cm$^2$ and about 90 g-cm$^2$. Such a moment of inertia may produce a desirable distance and trajectory, particularly when golf ball 400 is struck with a driver or driven against the wind.

Typically, golf ball 400 will have a compression deformation of about 2.2 mm to about 4 mm. In some embodiments, golf ball 400 has compression deformation of about 2.5 mm to about 3.5 mm. In some embodiments, golf ball 400 has compression deformation of about 2.5 mm to about 3 mm.

In some embodiments, the layers used to make golf ball 400 may have a specified relationship in terms of their respective physical properties. For example, for a greater moment of inertia, outer core layer 430 has a third specific gravity, and inner cover layer 420 has a fourth specific gravity, and the fourth specific gravity is greater than the third specific gravity.

While various embodiments of the invention have been described, the description is intended to be exemplary, rather than limiting and it will be apparent to those of ordinary skill in the art that many more embodiments and implementations are possible that are within the scope of the invention.

Accordingly, the invention is not to be restricted except in light of the attached claims and their equivalents. Also, various modifications and changes may be made within the scope of the attached claims.

We claim:

1. A golf ball comprising:
   an inner core layer;
   an outer core layer essentially enclosing the inner core layer;
   an inner cover layer essentially enclosing the outer core layer; and
   an outer cover layer essentially enclosing the inner cover layer,
   wherein the inner core layer includes a blend comprising a first highly neutralized acid polymer having a first Vicat softening temperature between about 50° C. and about 60° C. and a first specific gravity and a second highly neutralized acid polymer having a second Vicat softening temperature between about 40° C. and about 60° C. and a second specific gravity, wherein the absolute value of the difference between the Vicat softening temperatures is no more than about 2° C. and the absolute value of the difference between the specific gravities is no more than 0.005;
   wherein the outer core layer comprises polybutadiene rubber and is at least about 5 mm thick;
   wherein the inner cover layer comprises a first thermoplastic material and the outer cover layer comprises a second thermoplastic material, wherein said thermoplastic material of each of the inner cover layer and the outer cover layer independently comprises at least one of an ionomer resin, a polyamide resin, a polyurethane resin, and a polyester resin.

2. A golf ball comprising:
   an inner core layer;
   an outer core layer essentially enclosing the inner core layer;
   an inner cover layer essentially enclosing the outer core layer; and
   an outer cover layer essentially enclosing the inner cover layer,
   wherein the inner core layer includes a blend comprising a first highly neutralized acid polymer having a first Vicat softening temperature between about 50° C. and about 60° C. and a first specific gravity and a second highly neutralized acid polymer having a second Vicat softening temperature between about 40° C. and about 60° C. and a second specific gravity, wherein the absolute value of the difference between the Vicat softening temperatures is no more than about 1° C. and the absolute value of the difference between the specific gravities is no more than 0.005;
   wherein the outer core layer comprises polybutadiene rubber and is at least about 5 mm thick;
   wherein the inner cover layer comprises a first thermoplastic material and the outer cover layer comprises a second thermoplastic material, wherein said thermoplastic material of each of the inner cover layer and the outer cover layer independently comprises at least one of an ionomer resin, a polyamide resin, a polyurethane resin, and a polyester resin.

3. The golf ball of claim 1, wherein the inner core layer has a surface Shore D hardness of from about 45 to about 55.

4. The golf ball of claim 1, wherein the outer core layer has a surface Shore D hardness of from about 50 to about 60, which is higher than the surface hardness of the inner core layer.

5. The golf ball of claim 1, wherein the inner cover layer has a surface Shore D hardness of at least about 65 and the outer cover layer has a flexural modulus of from about 200 psi to about 3,000 psi.

6. The golf ball of claim 5, wherein said inner cover layer has a surface Shore D hardness of at least about 65 and the outer cover layer has a flexural modulus of from about 200 psi to about 3,000 psi.

7. The golf ball of claim 1, wherein the inner core layer has a diameter of from about 19 mm to about 32 mm.

8. The golf ball of claim 1, wherein the inner core layer has a first coefficient of restitution, the golf ball has a second coefficient of restitution, and the first coefficient of restitution is greater than the second coefficient of restitution.

9. The golf ball of claim 1, wherein a ratio of the first highly neutralized acid polymer to the second highly neutralized acid polymer is from about 20:80 to about 80:20.

10. The golf ball of claim 1, wherein the outer core layer has a third specific gravity, the inner cover layer has a fourth specific gravity, and the fourth specific gravity is greater than the third specific gravity.

11. The golf ball of claim 2, wherein the inner core layer has a surface Shore D hardness of from about 45 to about 55.

12. The golf ball of claim 2, wherein the outer core layer has a surface Shore D hardness of from about 50 to about 60, which is higher than the surface hardness of the inner core layer.

13. The golf ball of claim 2, wherein the inner cover layer has a surface Shore D hardness of at least about 65 and the outer cover layer has a flexural modulus of from about 200 psi to about 3,000 psi.

14. The golf ball of claim 13, wherein said inner cover layer has a surface Shore D hardness of at least about 65 and the outer cover layer has a flexural modulus of from about 200 psi to about 3,000 psi.

15. The golf ball of claim 2, wherein the inner core layer has a diameter of from about 19 mm to about 32 mm.

16. The golf ball of claim 2, wherein the inner core layer has a first coefficient of restitution, the golf ball has a second coefficient of restitution, and the first coefficient of restitution is greater than the second coefficient of restitution.

17. The golf ball of claim 2, wherein a ratio of the first highly neutralized acid polymer to the second highly neutralized acid polymer is from about 20:80 to about 80:20.

18. The golf ball of claim 2, wherein the outer core layer has a third specific gravity, the inner cover layer has a fourth specific gravity, and the fourth specific gravity is greater than the third specific gravity.

* * * * *